Dec. 4, 1951 L. B. SAMMIS ET AL 2,577,273
APPARATUS FOR PROCESSING OLIVES
Original Filed Sept. 14, 1945 2 SHEETS—SHEET 1

INVENTORS
L. B. Sammis
R. L. Keck
BY
ATTORNEYS

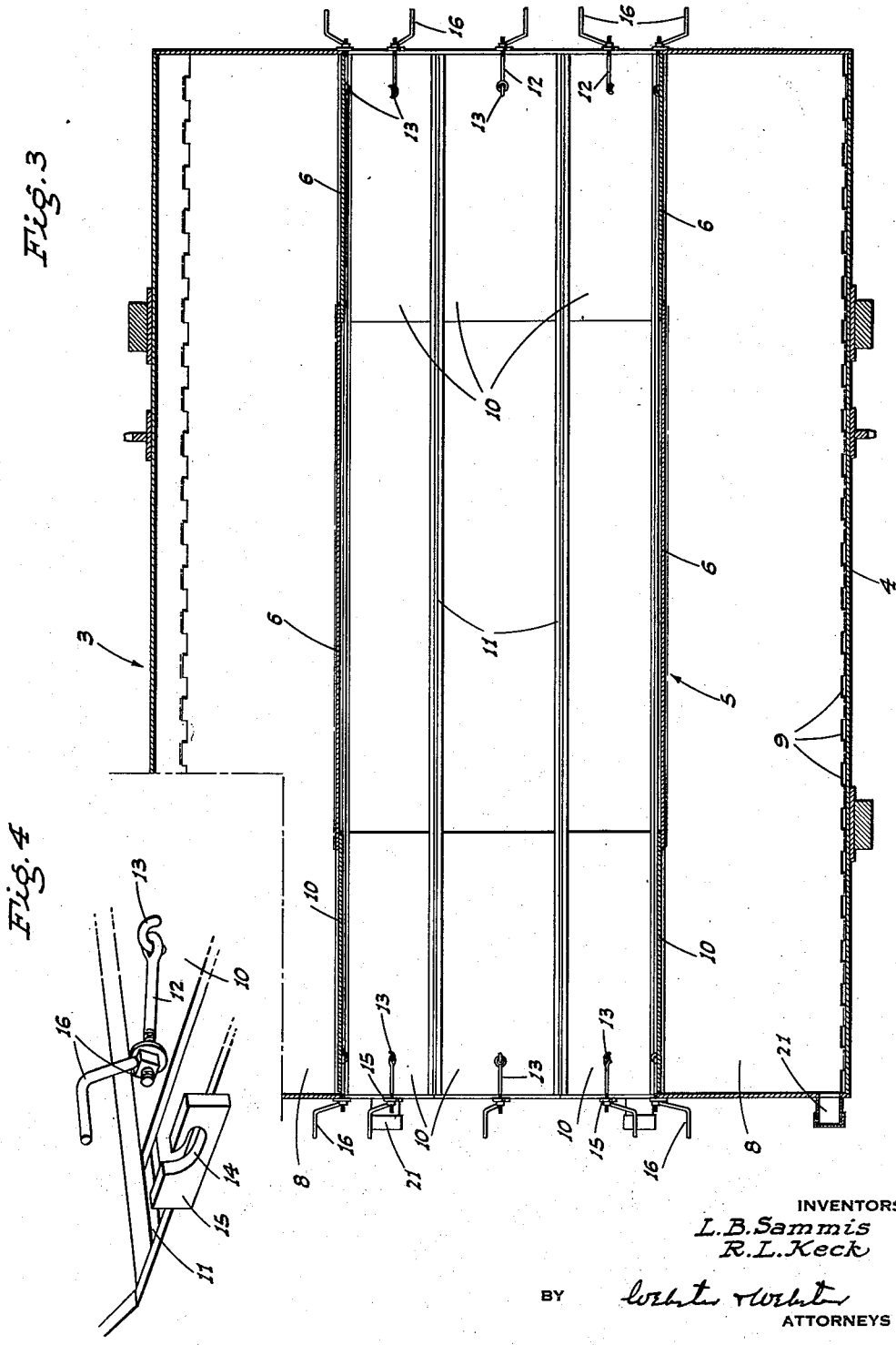

Patented Dec. 4, 1951

2,577,273

UNITED STATES PATENT OFFICE 2,577,273

APPARATUS FOR PROCESSING OLIVES

Louis B. Sammis and Ray L. Keck,
Wallace, Calif.

Original application September 14, 1945, Serial No. 616,194, now Patent No. 2,464,947, dated March 22, 1949. Divided and this application February 23, 1949, Serial No. 77,876

2 Claims. (Cl. 99—240)

This application is a division of application filed September 14, 1945, Serial No. 616,194, now Patent No. 2,464,947, granted March 22, 1949, and is directed to a preferred form of apparatus for treating olives in accordance with the process disclosed in such aforesaid application. The problems involved in the successful processing of olives and how our improved process solves some of those problems is set forth at length in said copending application to which reference is made, and, therefore, will not be repeated here.

The primary object of the present invention is to provide a new type of apparatus for carrying out a continuous treatment of green ripe olives as distinguished from the so-called batch system described at length in the above original application of which this is a division.

A further object of the invention is to provide an apparatus in which a mass of olives may be first immerged in and then slowly moved through a treating solution, then out of the solution and through a path of movement through the air, including a means whereby the olives will be continuously tumbled about relative to each other as they are moving through the air so that each individual olive will be exposed to the oxidizing action of the air whereby to cause all of the olives to be substantially uniformly darkened in color as is essential to the production of a high grade marketable final product.

A still further object of the invention is to provide a means to drain the solution from the olives as they travel the path through the air so as to render the oxidizing action of the air fully effective, as well as to conserve the supply of such solution.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Figure 3 is a longitudinal vertical section through the drum.

Figure 4 is a fragmentary perspective view of a compartment door latch.

Figure 1:
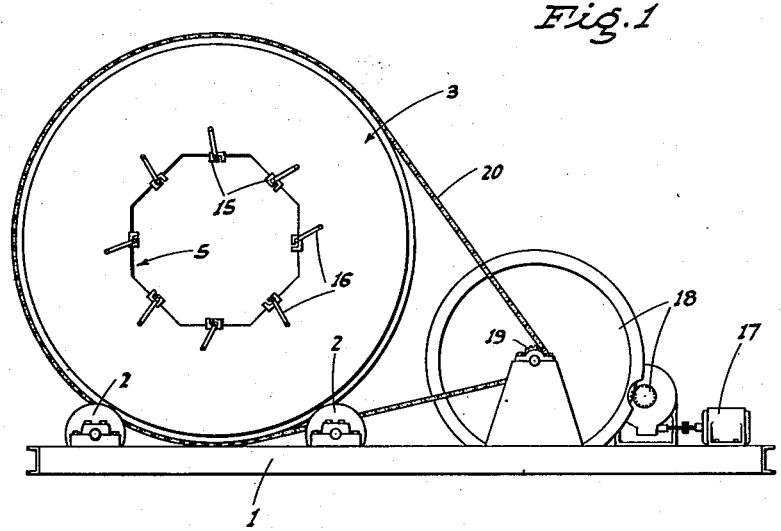
Figure 1 is an end view of the apparatus.

Referring now more particularly to the characters of reference on the drawings, the numeral 1 designates any desirable form of supporting foundation or framework. Mounted on this support are pairs of spaced apart rollers 2 and supported for rotation on these rollers is a drum having an impervious outer shell 4 and an impervious polygonal inner shell 5 spaced from the shell 4. Connecting between the corners of adjacent sides 6 of the shell 5 and the shell 4 are partition walls 7 which divide the drum 3 into a plurality of compartments 8.

Along the length of each partition wall 7 and preferably immediately adjacent the shell 4 there are provided a plurality of longitudinally spaced apart small slots 9 which open communication from compartment to compartment 8 at that point.

At each end of each side 6 is a door operable to open communication from the open center portion of the drum into each compartment 8. In the preferred form shown in the drawings, each of these doors comprises a sliding plate 10 slidable in guides 11. These slide doors are to be locked tightly in closed position by suitable means. As an example, there is shown a rod 12 linked to each door as at 13. This rod is adapted to be engaged under a cam slot 14 in a plate 15 located at the end of the drum and locked in that position by a screw nut unit 16.

Any suitable means for very slowly rotating the drum is provided. In the present instance and as the preferred form, there is shown a motor 17 driving a reduction gear assembly 18 which in turn drives a small gear 19 connected in driving relation with the drum 3 by a chain 20.

In using the invention a solution of sodium hydroxide or other proper treating solution is filled into the lower portion of the drum to a depth to cover olives introduced in the compartments to a depth of two or three inches. With the slow rotation of the drum whereby the compartments 8 move in a circular path about the axis of the drum the solution will drain by gravity through the slots 9 from the uppermost compartments so that the solution will remain in the lowermost compartments.

Figure 2:
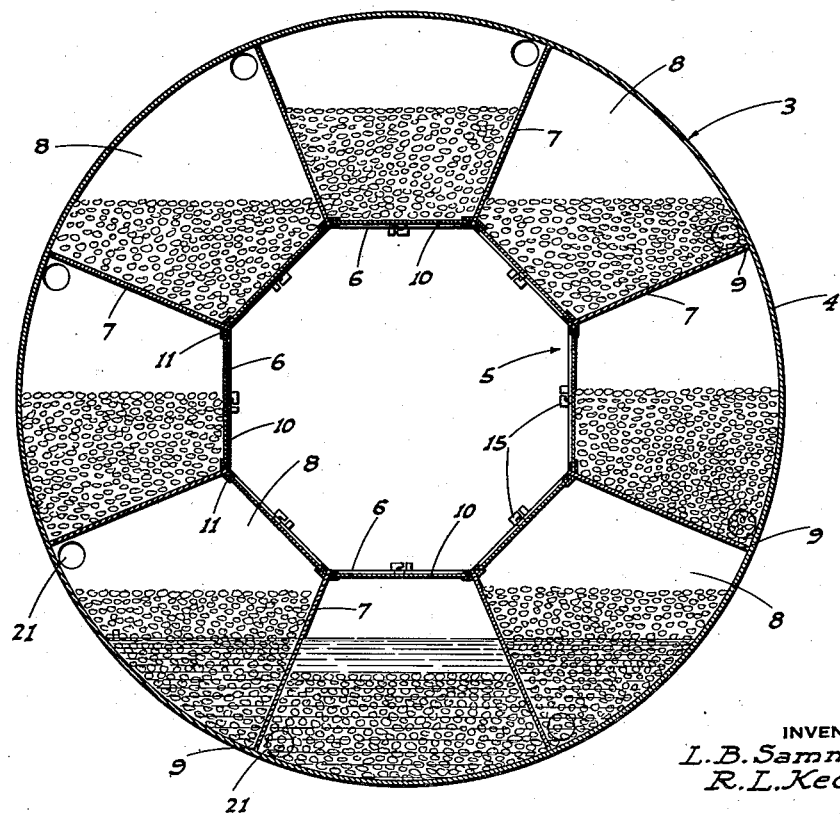
Figure 2 is a transverse vertical section through the processing drum.

The olives are to be introduced into the compartments for treatment and this is accomplished by successively opening the doors 10 and fluming or pumping the olives into each compartment to a desired depth so that when the compartments are in their lowermost position the olives therein will be covered by the solution to the desired depth, as illustrated in Fig. 2 of the drawings. The doors are then tightly closed.

The solution and olives being then in the drum in the manner described, the drum is slowly rotated. Due to the slow speed of the drum the sodium hydroxide solution remains at a fairly constant level in the lower side of the drum while the olives in the several compartments 8 are slowly and intermittently moved through this solution and then out of the same for exposure to the air. As the drum rotates, the olives slowly and uniformly roll about each other to keep them fairly well agitated, and as they move out of the solution into the air and on about the circle of movement, they tumble about so that they have complete and uniform surface exposure to the air and become thoroughly oxidized before the rotation of the drum is discontinued. Such rotation of the drum is first discontinued when the solution has cut into the flesh of the olives to a depth of approximately one-sixteenth of an inch, and in our process this usually takes from three to six hours according to the condition of the olives. In this same period of time the olives have not only been properly penetrated by the solution to that depth, but they have been simultaneously therewith and automatically subjected to the proper oxidation so that at the end of this rotation of the drum they are ready for the water treatment which is necessary to the proper diffusion of the coloring matter.

The sodium hydroxide solution is, therefore, withdrawn and water substituted therefor and the drum is then again slowly rotated in the presence of this water for a period of about twelve hours which thoroughly washes out the treating solution and diffuses the coloring matter uniformly throughout all the olives.

The water is withdrawn and another solution of sodium hydroxide introduced into the drum and the rotation of the drum repeated with the same result of continuing the penetration of the solution to a further depth into the flesh of the olives. The sodium hydroxide is then withdrawn and the olives again subjected to the water treatment after which a final treatment with the sodium hydroxide is indulged in followed by a final washing of the olives, all within the drum.

The process, carried out in our apparatus and according to our method, is usually completed within a period of about three days as against the period of from seven to ten days required under the old process. Furthermore, due to the gentle manipulation and constant agitation of the olives as they move through the sodium hydroxide, and through the air, and through the water, the penetration of the sodium hydroxide is more thorough, and the diffusion of the coloring matter through the olives is much more uniform so that the final product is firmer, more properly colored, and in much more uniform condition as to both, than are olives processed under previous methods.

It will also be apparent that due to the fact that when the olives are once placed in the drum, the handling of the same is entirely and automatically taken care of by the operation of the drum, there is very little labor cost involved in handling the same.

When finally completely processed in the drum, the olives will be withdrawn from the several compartments by any desired method, preferably through the use of a standard olive pump which is available on the market or by sluicing them out through outlet openings 21 at the end of each compartment 8. Just as soon as the olives are withdrawn from the drum, the drum may be put into operation on another batch of olives.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Pattent is desired.

1. An apparatus for the purpose described comprising a drum mounted for slow rotation, means to rotate the drum, the drum comprising spaced apart inner and outer shells impervious to air and liquid, radially disposed partition walls spaced apart circumferentially of the drum between the inner and outer shells to divide the drum into circumferentially spaced compartments each wall being provided with longitudinally spaced slots in its edge adjacent the outer shell, door means in the inner shell for opening into each compartment, and an outlet means from each compartment adjacent the outer shell thereof.

2. An apparatus for the treatment of olives comprising a substantially horizontally disposed drum which includes an outer wall and an inner wall spaced from the outer wall and substantially concentric therewith, end walls connecting the spaced outer and inner walls, all of such walls being impervious to liquid and leaving a central open area through the drum, circumferentially spaced inner partition walls extending longitudinally of the drum between the inner and outer walls and dividing the drum into separate compartments, such partition walls being pervious to liquid and air, means for introducing olives into the compartments, a treating liquid in the lower portion of the drum, and means to rotate the drum at a speed which will leave the liquid at a substantially constant level whereby olives in the compartments will successively move into and out of the liquid with the rotation of the drum; the compartments having individual access openings in the inner drum wall.

LOUIS B. SAMMIS.
RAY L. KECK.

REFERENCES CITED

The following references are of record in the file of this patent:

UNITED STATES PATENTS

| Number | Name | Date |
|---|---|---|
| 608,446 | Eastwick | Aug. 2, 1898 |
| 676,608 | Hale | June 18, 1901 |
| 906,851 | Bailey et al. | Dec. 15, 1908 |
| 948,679 | Brandenburg | Feb. 8, 1910 |
| 1,010,637 | Kircheis | Dec. 5, 1911 |
| 1,741,249 | Powell | Dec. 31, 1929 |
| 1,995,996 | Delemme | Mar. 26, 1935 |